United States Patent [19]

Woods

[11] Patent Number: 4,790,898
[45] Date of Patent: Dec. 13, 1988

[54] METHOD AND APPARATUS FOR FIBER LAMINATION

[75] Inventor: Quentin T. Woods, Redmond, Wash.
[73] Assignee: The Boeing Company, Seattle, Wash.
[21] Appl. No.: 414,532
[22] PCT Filed: Jul. 19, 1982
[86] PCT No.: PCT/US82/00974
    § 371 Date: Jul. 19, 1982
    § 102(e) Date: Jul. 19, 1982
[87] PCT Pub. No.: WO84/00351
    PCT Pub. Date: Feb. 2, 1984
[51] Int. Cl.⁴ ............................................. B32B 31/18
[52] U.S. Cl. ................................... 156/166; 156/256;
                                        156/353; 156/441; 156/517
[58] Field of Search ............... 156/166, 181, 441, 433,
    156/256, 264, 265, 324, 517, 353, 555, 185, 173,
                                                172, 425; 264/137

[56] References Cited

U.S. PATENT DOCUMENTS

| | | | |
|---|---|---|---|
| 1,394,431 | 10/1921 | Lea | 28/213 |
| 3,112,234 | 11/1963 | Krupp | 156/169 |
| 3,249,484 | 5/1966 | Countney | 156/441 |
| 3,258,378 | 6/1966 | Kelsey | 156/161 |
| 3,574,040 | 4/1971 | Chitwood et al. | 156/522 |
| 3,616,063 | 10/1971 | Bradley | 156/429 |
| 3,617,414 | 11/1971 | Wesch | 156/175 |
| 3,629,028 | 12/1971 | Melartz | 156/175 |
| 3,707,415 | 12/1972 | Golladay et al. | 156/169 |
| 3,755,060 | 8/1973 | Bullock | 156/166 |
| 3,775,219 | 11/1973 | Karlson et al. | 156/526 |
| 3,810,805 | 5/1974 | Goldsworthy et al. | 156/361 |
| 4,071,389 | 1/1978 | Ives | 156/175 |
| 4,292,108 | 9/1981 | Weiss et al. | 156/523 |

Primary Examiner—Michael Ball
Attorney, Agent, or Firm—James P. Hamley; B. A. Donahue

[57] ABSTRACT

A series of filaments are grouped into rovings (10), with each roving being impregnated with a viscous, tacky resin binder. The rovings are guided (12, 14, 16) to and compressed against a mandrel (18). By controlling intraroving spacing and compression force, the rovings are compressed such that their lateral expansion results in adjacent roving bonding, whereby a singular band (22) of defined width, height and filament count is formed. The height and width is controlled by varying the compression force and the intraroving spacing. Band contouring is realized by severing (24, 26) selected rovings prior to band formation. Linear and rotational relative motion is provided (FIG. 11: 110, 112, 114) between the roving guiding and compression means and the mandrel to precisely orient the band.

30 Claims, 12 Drawing Sheets

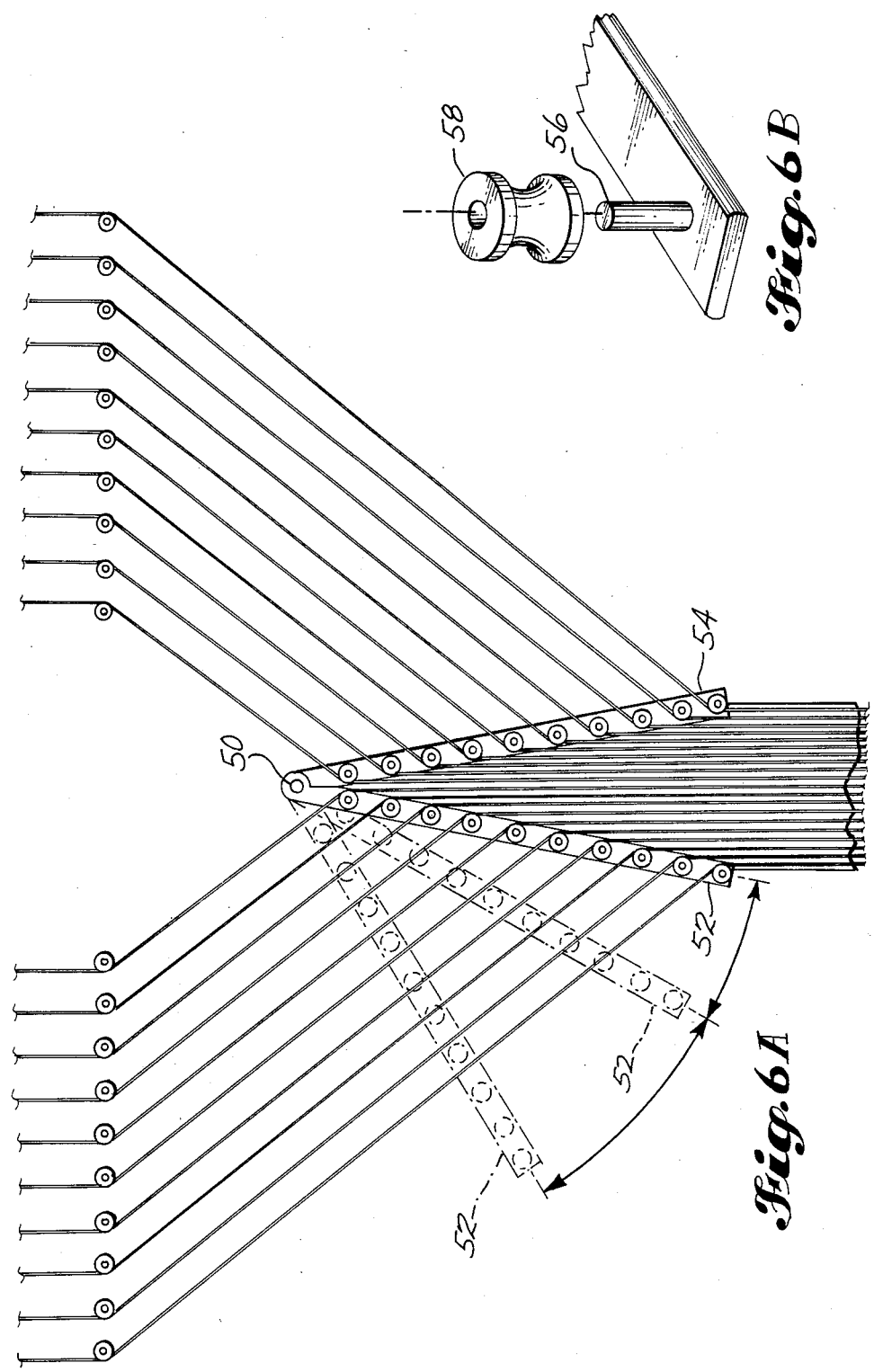

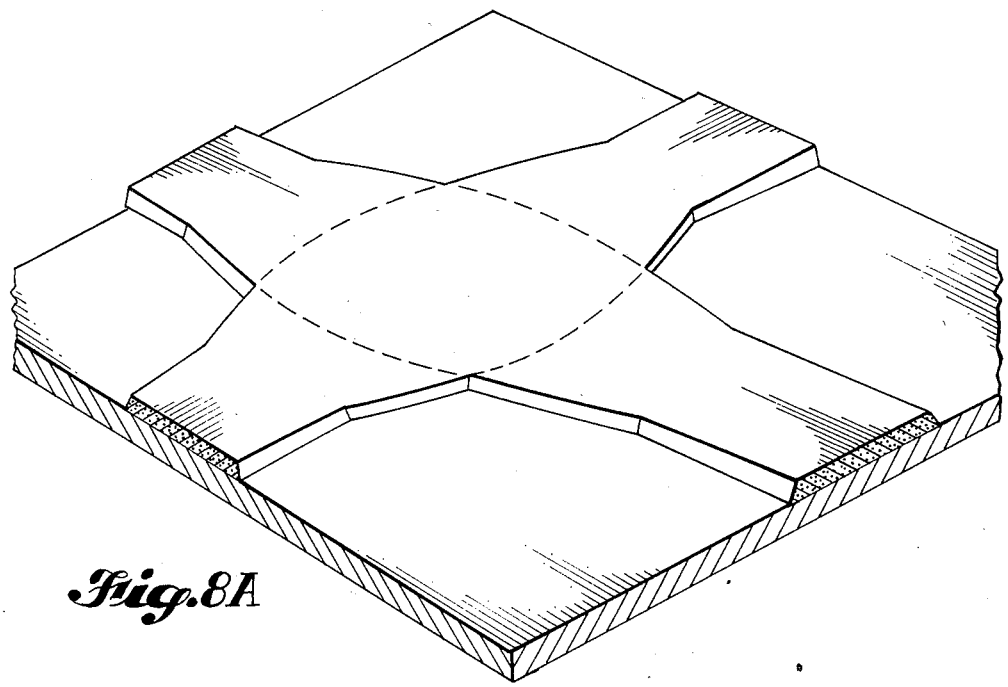
*Fig.* 8A
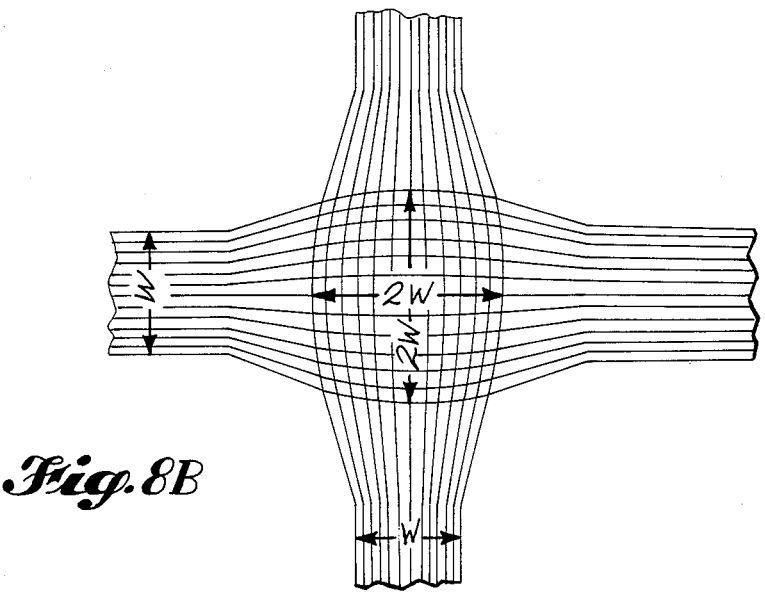
*Fig.* 8B

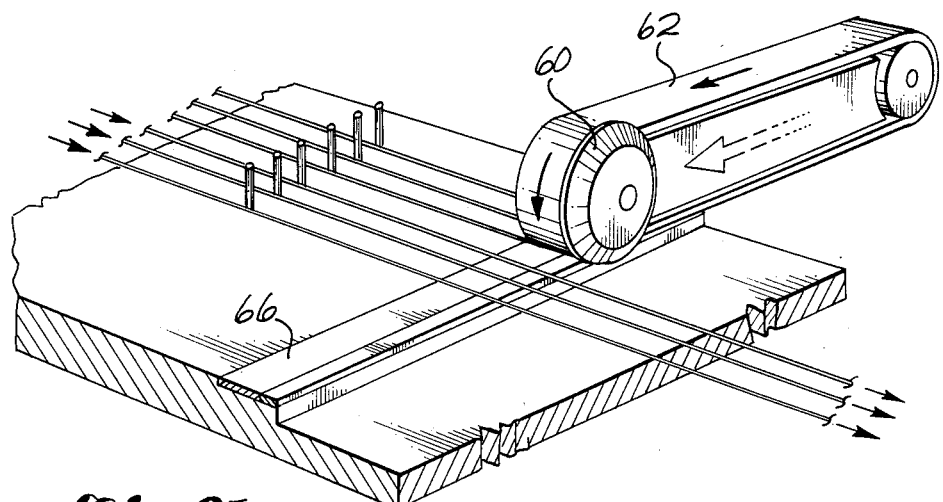
Fig. 9A
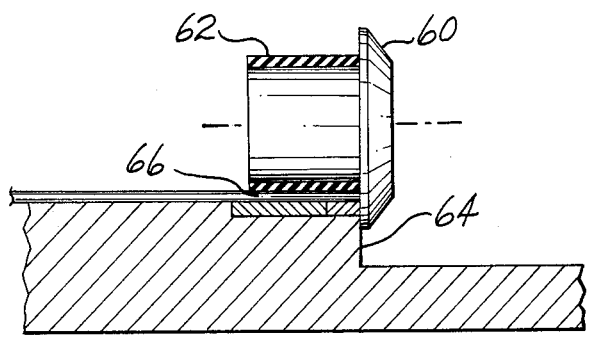
Fig. 9B
Fig. 9C
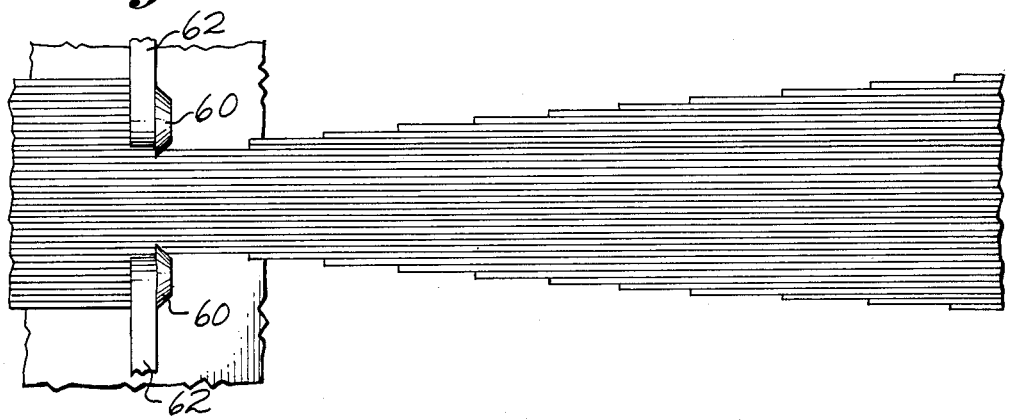

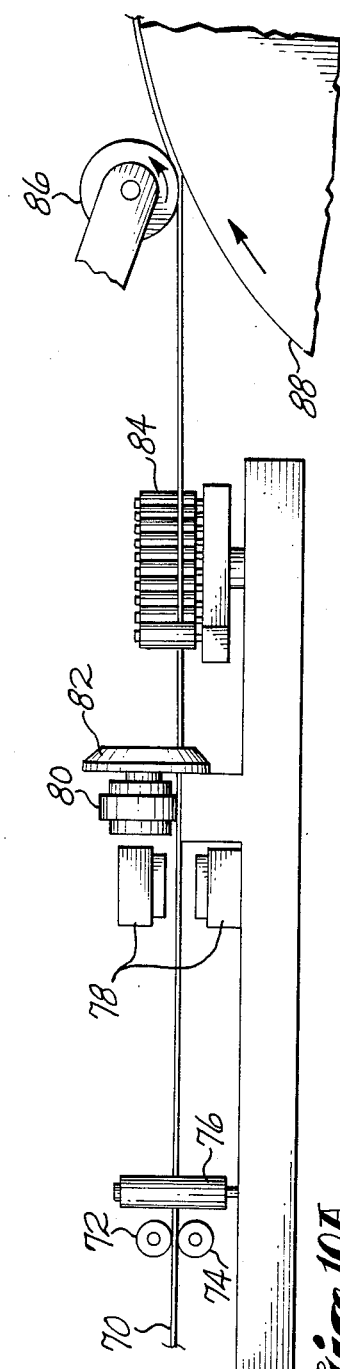
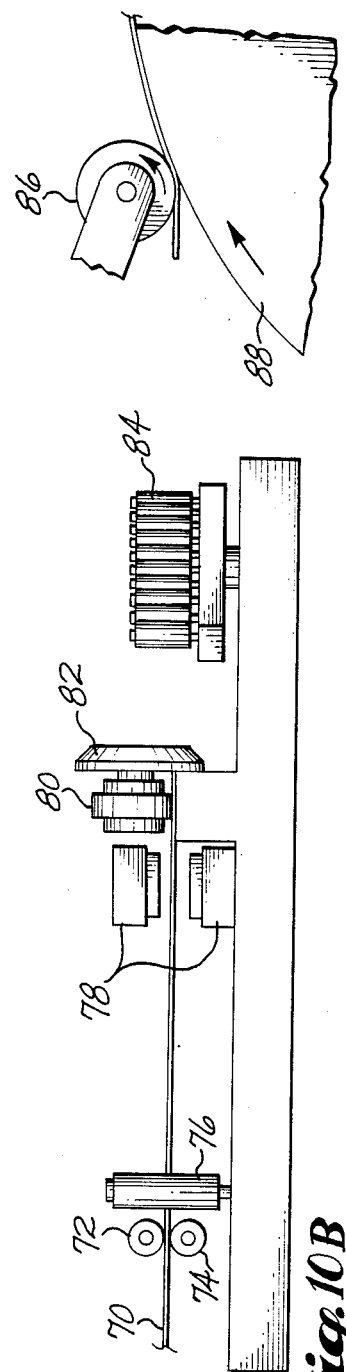

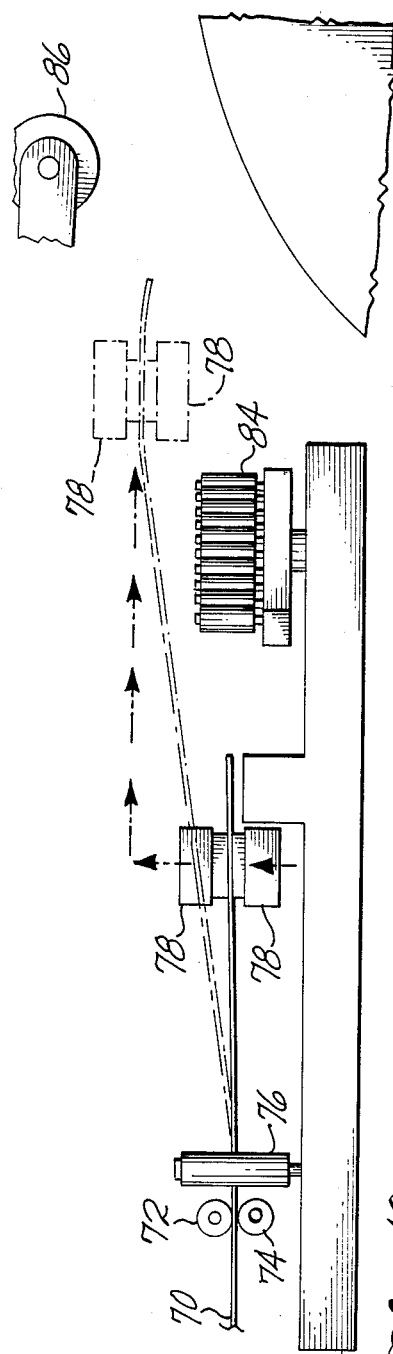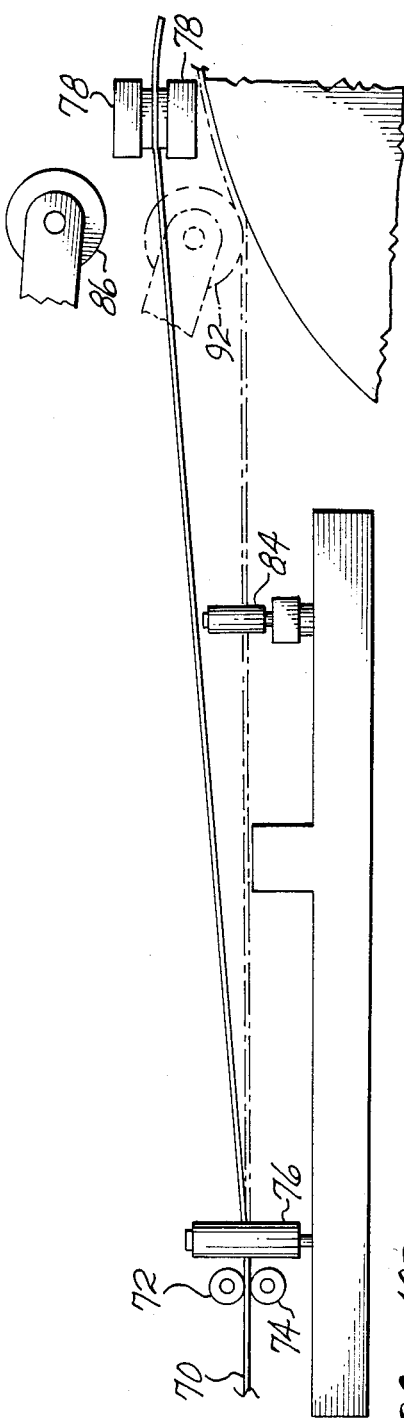
Fig.10C
Fig.10D

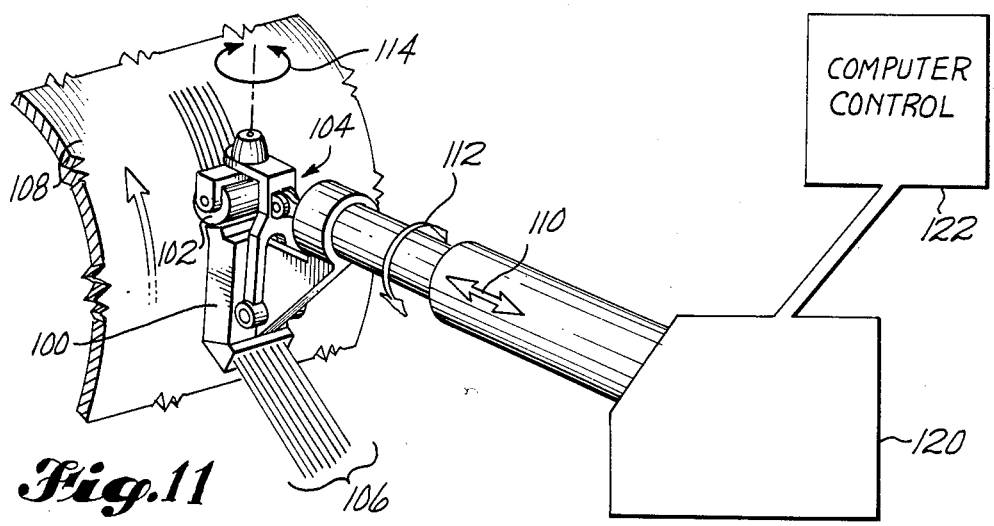
Fig. 11
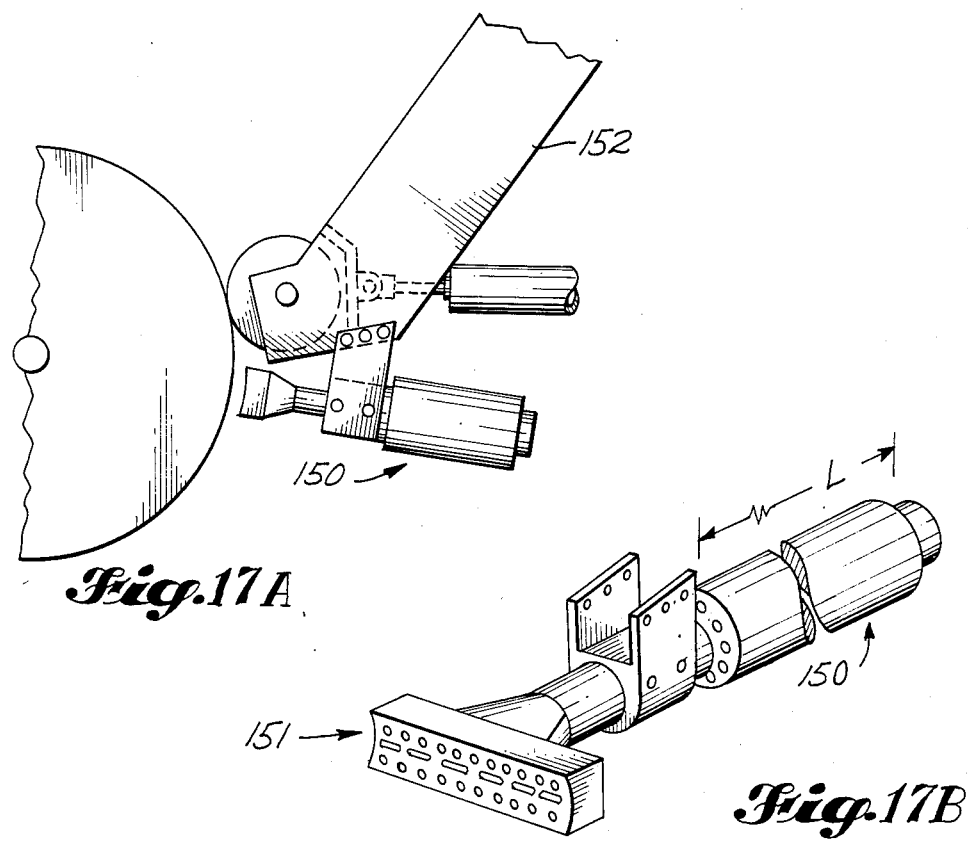
Fig. 17A
Fig. 17B

METHOD AND APPARATUS FOR FIBER LAMINATION

BACKGROUND OF THE INVENTION

The present invention pertains to the composite structure manufacturing art and, more particularly, to a method of, and apparatus for, fiber lamination.

Composite material technology provides a means to fabricate a high strength, low weight structure. Such technology finds particular application in the aerospace industry.

At present, three principal composite manufacturing methods are practiced. These include tape lay-up, cloth or woven broad good lay-up and filament winding. Each of these manufacturing techniques exhibits serious limitations, as is discussed below.

Tape lay-up composite material manufacturing is comprised of the laying of sections of tape side by side, or in an overlapped relationship, to form the composite structure. This lay-up may be accomplished manually, with mechanical assist, or by fully automatic tape lay-up machines. The fabrication of complex shapes, such as corners, bevels and tapered sections is a tedious process using the tape lay-up method. Often, successive tape sections must be of different widths and/or lengths. A certain amount of overlap must be provided, thereby forming an undesirable "shingle step".

In addition, where the tape is required to form a compound-curve surface, undesirable tape buckling occurs on the concave edge. Further, where changes in direction are required, the tape must be cut and spliced to avoid buckling and strand gapping.

In addition, ply thickness is fixed for a given tape. If changes in either ply thickness or tape width are required, the process must be interrupted to change tape spools.

Cloth good lay-up does not lend itself to mechanization or automation. Further, cutting out contours and laminating these contour shapes is a cost-intensive procedure and often realizes significant material trim losses. In addition, design compromises must be made due to the inability to select any desired fiber angle and the requirement to shingle layer to obtain tapers.

Conventional tape winding manufacturing techniques are deficient in two areas. First, the winding process is generally slow, producing a relatively low productivity rate with limited strand direction capability.

In addition, limitations inherent in the winding process limit manufacturing flexibility. For example, an ideal composite material should have a minimum of gaps between filaments with a maximum ratio of filament area to resin area. Such construction provides the optimum strength-to-weight ratio. Present winding techniques do not realize the optimum ratio. In addition, the filament distribution tends to lack uniformity, such that some filaments are less well supported than others. Further, to make optimum use of the potential of composite materials, the filaments should be consistently and accurately aligned in the direction of the loads being carried, with the quantities of filaments being consistently matched to the load requirements. This requirement can be met relatively easily when the structure and load pattern are geometrically simple. In many applications, however, such as aircraft structure, complicated geometrical shapes must be constructed such that filament winding alignment is necessarily compromised and extra material must be used to meet design requirements. In addition, present winding techniques require overlaps, "shingling", "turn-arounds" and so forth. The net result of these factors is a decrease in strength-to-weight ratio and a limitation in the ability of the manufacturing operation to construct precise contours. Further, the tension winding technique employed in filament winding promotes resin migration and warpage during subsequent autoclave curing.

SUMMARY OF THE INVENTION

It is an object of this invention, therefore, to provide an improved composite material manufacturing method, and apparatus therefor, which is capable of fast, efficient manufacture of any desired structure shape and size.

Briefly, according to the invention, a method for producing fiber laminations comprises the steps of:

(a) providing a plurality of rovings, with each roving comprised of a bundle of resin-impregnated filaments;

(b) predeterminedly guiding the rovings to a receiving surface with a predetermined spacing between the rovings; and (c) compacting the rovings against the receiving surface such that adjacent rovings permanently bond together and form a continuous band conformed to the countour of the receiving surface.

Apparatus for producing fiber laminations comprises a predeterminedly contoured mandrel for supporting the fiber laminations. A guide guides each of a plurality of rovings, with each roving being comprised of a bundle of resin-impregnated filaments, to the mandrel. A compaction means compacts the rovings against the mandrel such that adjacent rovings permanently bond together and form a band contoured to the mandrel.

BRIEF DESCRIPTION OF THE DRAWINGS

FIGS. 5A, 5B and 6A, 6B illustrate alternate adjustable comb constructions;

FIGS. 8A and 8B illustrate perspective, and top views, respectively, of a pad-up intersection having constant thickness;

FIGS. 9A–9C illustrate means for cutting and clamping rovings to form a contoured band;

FIGS. 10A–10D illustrate the method and apparatus used in the fiber lamination rethreading sequence;

FIG. 11 illustrates computer controlled fiber lamination apparatus;

FIGS. 17A–17B illustrate a fiber lamination head which includes a hot air attachment.

DETAILED DESCRIPTION OF THE PREFERRED EMBODIMENTS OF THE INVENTION

Figure 1:
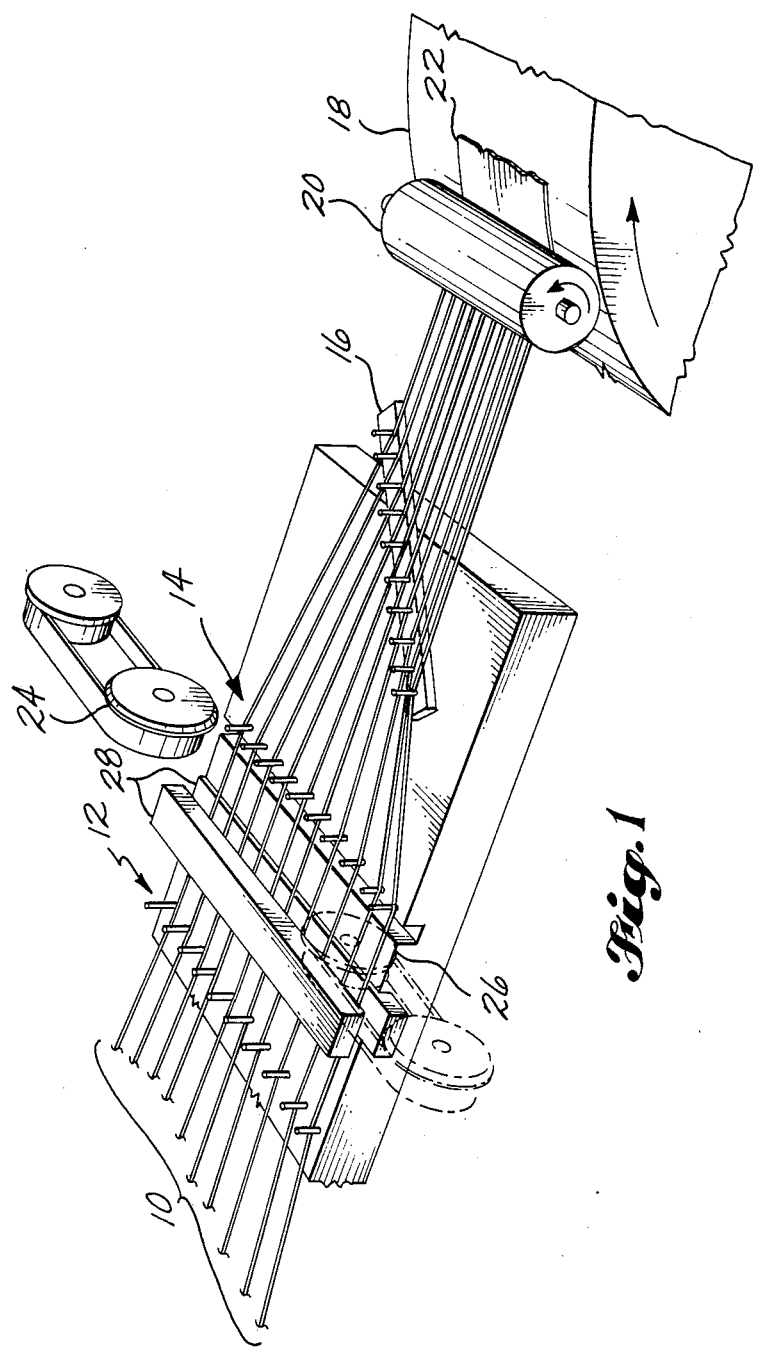
FIG. 1 is a perspective view of one configuration of the apparatus for practicing the inventive fiber lamination method.

FIG. 1 is a perspective view of the principal elements used in the present fiber lamination process. Here, a plurality of rovings, indicated generally at 10, are routed through the spacing tines of fixed combs 12, 14 and then through an adjustable comb 16 before being compressed against a receiving surface or mandrel 18 by a compaction roller 20. As is shown more clearly in FIG. 2A, each roving is comprised of a bundle of filaments, there being, for example, 6,000 filaments in one roving 0.060 inches (0.1524 centimeters) in diameter. Each roving is impregnated with a viscous, tacky resin binder.

Rotation of the adjustable comb 16 controls the inter-roving spacing prior to compaction by compaction roller 20. As is understood more fully with respect to FIGS. 2A–2C and FIGS. 3A–3C, the inter-roving spacing determines the height of the resulting compacted band 22 as well as the filament count.

A pair of movable cutter 24, 26 are positioned on opposite sides of the rovings 10. As is discussed more fully with respect to FIGS. 9A–9C, selected rovings may be cut by the cutters 24, 26 to thereby control the contour of the resulting band. Rethreading of cut rovings is accomplished via a clamp pair 28 which, in a manner discussed in detail with respect to FIGS. 10A–10D, rethreads cut rovings through the compaction roller 20 and to the mandrel 18.

Figure 2A:
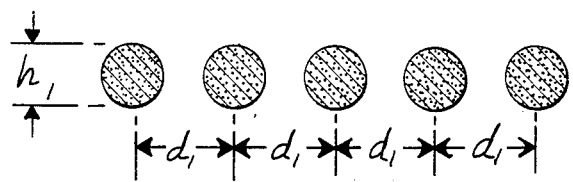
FIGS. 2A–2C show, in cross-sectional view, the progressive compaction of the rovings into a unified band.

FIG. 2A is a cross-sectional view of five rovings, as illustrated in FIG. 1. Each roving is comprised of a series of filaments. These filaments may be made of graphite, carbon, fiber glass, boron, steel or other metals, man-made materials, such as Kevlar, or any combination thereof.

A binder or adhesive holds the individual filaments in place within each roving and, in turn, maintains the overall circular cross-sectional shape of each roving prior to compaction. This binder may be pre-applied to the individual rovings prior to the fiber lamination process or the fiber lamination apparatus can apply the binder to the roving as a processing step within the fiber lamination process.

In general, a thermalset or thermalplastic resin can be pre-applied to the roving as a "pre-preg" or the resin may be applied as an integral part of the fiber lamination process. Further, a "hot melt" is a "pre-preg" which must be heated during the fiber lamination process. FIGS. 16A and 16B illustrate a hot air attachment to a fiber lamination control head.

Figure 2B:
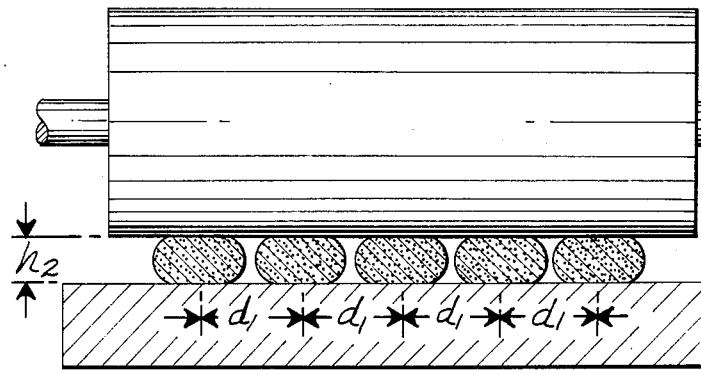
Figure 2C:
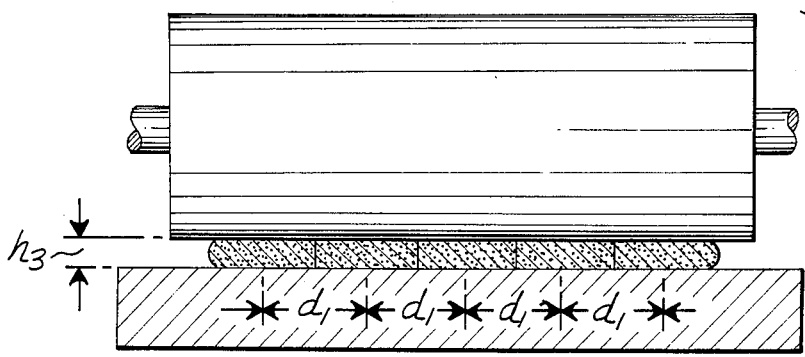

The rovings, as illustrated in FIG. 2A, have an initial height $h_1$ and an assigned inter-roving spacing $d_1$. FIG. 2B illustrates a compaction force F on the rovings via the compaction roller 30. As shown, each roving, as a result of compaction, has a reduced height, now $h_2$ and an increased width. The compaction process continues until, as shown in FIG. 2C, adjacent rovings have mated, forming a permanently bonded singular ribbon or band.

The inter-roving bonding is accomplished via the resin impregnation. While there is a tendency for the resin on the surface of the roving to lose its "tack" due to contamination and exposure to the air, the action of compaction of the rovings exposes fresh tacky resin from within each roving such that a secure bond between rovings is assured.

Figure 3A:
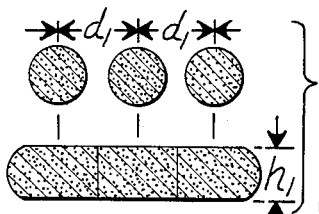
FIGS. 3A–3C show, in cross-sectional view, controlling the height of the band and the fiber density by varying the inter-roving spacing.
Figure 3B:
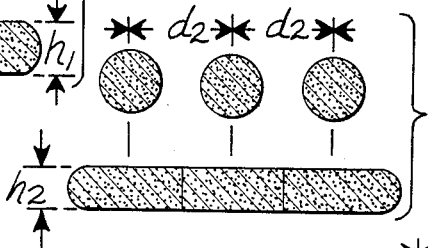
Figure 3C:
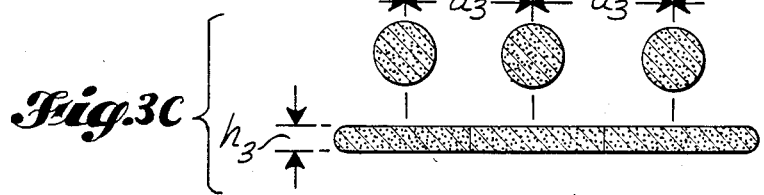

A particular feature of the present fiber lamination process is that the height of a compacted band may be controlled by adjustment of the intraroving spacing. This is illustrated in FIGS. 3A–3C which are cross-sectional views of rovings before and after compaction. As shown, the band formed by compacting the rovings of FIG. 3A, having an intraroving spacing of $d_1$, results in a band of thickness $h_1$, which band is thicker than the compacted rovings shown in FIGS. 3P, of larger spacing $d_2$, or that of FIG. 3C, having even larger spacing $d_3$.

A further feature of the invention is that the fiber count, to satisfy an assigned load, can be accomplished by controlling the strand spacing without stopping the process to change supply spools.

Figure 4:
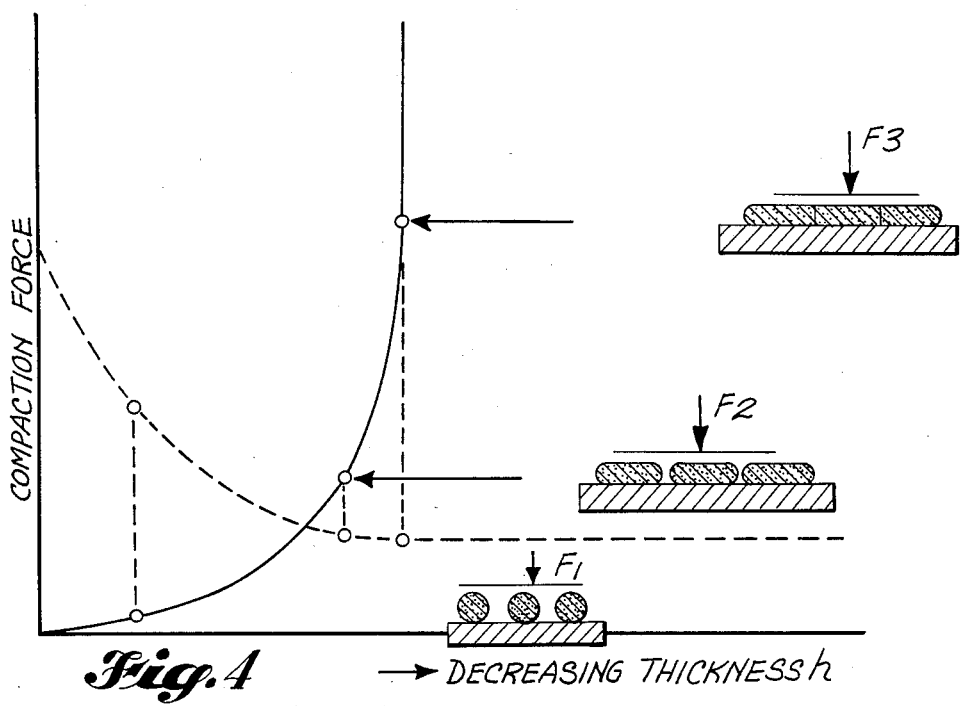
FIG. 4 is a graph illustrating compaction force plotted against band thickness.

FIG. 4 is a graph illustrating compaction force versus resulting band thickness h. As shown, increasing compaction force results in a decreasing thickness h, until such time that additional compaction force produces an insignificant difference in band thickness. Thus, by incorporating a means to detect the point at which additional compaction force does not reduce band thickness, the present process is capable of a self-check to assure adequate, but not excessive, compaction force.

Several advantages to the fiber lamination process are seen immediately. First, band thickness is controlled simply by varying the intraspatial distance between rovings. Further, filament density of the band is also controlled by varying the space between adjacent rovings within the band. This is an important feature for fabricating aircraft structure, such as wings, which have varying loads along their length. By simply controlling intraroving spacing, the wing skins may be of controlled fiber density to suit wing loading. In addition, such variaions can be accomplished without interrupting the production process.

A further advantage of the present technique is that no laps or gaps are possible by use of progressive compaction. That is, when a second band is to be laid next to the first compacted band, the space between the two adjacent bands is controlled to be the same as the intraroving spacing within a band. Thus, under compaction, the second band will laterally expand and bond to the first band, creating a continuous band equal to twice the width of the first band. The absence of gaps or laps is highly desirable for high stress carrying parts. Further, fatigue performance is enhanced in that fatigue is highly dependent upon the degree of gaps between adjacent structures. Laps and gaps result in air entrapment, thereby being detrimental to structural integrity.

FIG. 1 illustrates controlling intraroving spacing by means of a rotating, or polar, comb. Alternate adjustable combs are illustrated in FIGS. 5A, 5B and 6A, 6B.

Figure 5A:
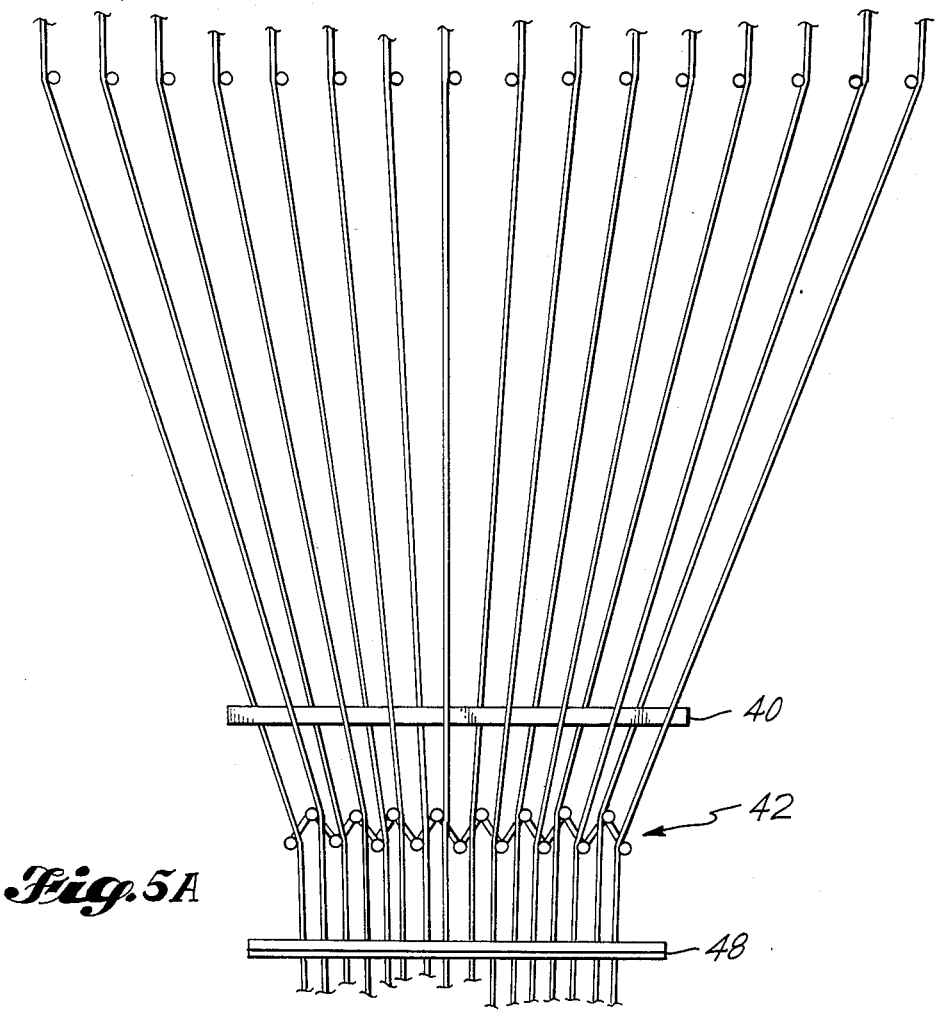
Figure 5B:
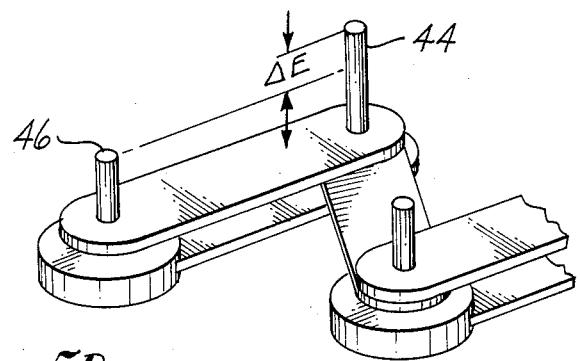

FIGS. 5A, 5B illustrate an "accordian link" comb which is particularly adapted for dense intraroving spacing. The rovings are split into two levels by a rod 40. They then pass through the expandable/contractable comb 42. Comb 42 is comprised of a series of links, with a pivot point at each link pair being provided with a fixed length pin. Alternate pins, such as pin 44, are higher than neighboring pins, such as pin 46. One set of rovings engages the high pins, while the other engages the lower pins, thereby achieving spacing control.

Downstream of the expandable comb 42 the rovings are brought to a common elevation by an elevation combining rod 48, whereafter the rovings are compacted as described heretofore.

The adjustable comb of FIGS. 6A, 6B is comprised of a hinged comb pair. A common pivot 50 provides a hinge point for each element 52, 54 of the comb pair. Each comb pair 52, 54 includes pins, such as pin 56, which support low-abrasion rollers, such as roller 58. The rovings are routed around each roller to the compaction head (not shown).

Intraroving spacing is controlled by adjusting the angle $\alpha$ between comb pairs. Thus, a decreasing angle $\alpha$ results in a closer intraroving spacing.

Structure contours which are easily formed by the present fiber lamination process are illustrated in FIGS. 7A, 7B and 8A, 8B.

Figure 7A:
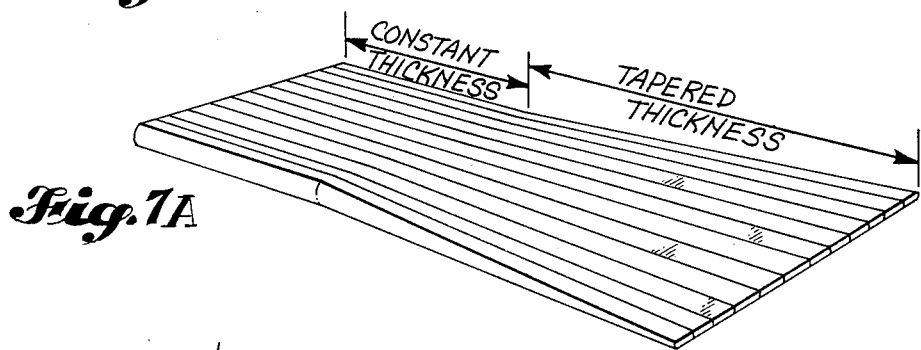
FIGS. 7A and 7B are perspective, and top views, respectively, of a tapered band.
Figure 7B:
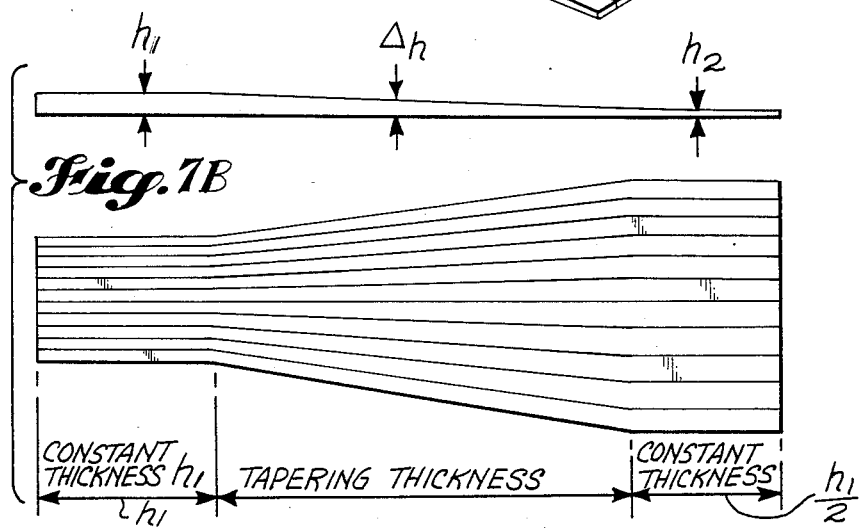

FIG. 7A illustrates, in perspective view, a tapered thickness section. This section is easily formed, as outlined in FIG. 7B and with the discussion given heretofore, by gradually varying the intraroving spacing at a rate which is a function of the desired thickness taper rate prior to the compaction step. Thus, as shown in FIG. 7B, a taper beginning with a thickness $h_1$ is varied at a rate $\Delta h$ until a thickness equal to $h_1/2$ is achieved. By use of any of the aforementioned adjustable combs, the intraroving spacing may be precisely controlled to achieve the desired tapered contour or fiber density.

FIG. 8A is a perspective view of a typical aircraft skin with intersecting "pad-ups" as integral composite structure. This structure may be fabricated, as shown in FIG. 8B, by the present fiber lamination process in a manner such that stress flow through the intersection is continuous. This, despite the fact that the height of the intersecting pad-up is the same as the height of individual pads even though there are twice as many rovings in the intersection. This is accomplished by controlling the intraroving spacing such that the spacing over the pad-up intersection is twice the spacing removed from the intersection. This prevents interlaminar shear stress between two plies having fibers oriented at right angles. Thus, such an intersection may be easily formed by the present method, whereas prior art techniques such as cloth and tape lay-up do not lend themselves to easy intersection structure fabrication.

FIGS. 9A-9C and 10A-10D illustrate a means for producing a lamination wherein the band is both narrowed and made thinner. The basic concept employed is to sever and clamp the number of rovings which are compacted.

FIG. 9A illustrates a rotating, single-facet shear blade, or knife 60. Associated with the knife 60 is a driven, clamping belt 62. As shown in FIG. 1, knife and clamping assemblies are located on either side of the roving guides, at a position in which roving intraspacing is fixed. The knife and clamp assemblies may be pulsed forward, into a channel, or ledge 64 provided in the roving guide, shown in cross section in FIG. 9B. As the assembly is pulsed forward a distance equal to the fixed comb spacing, one roving is cut and clamped. Preferably, the clamping action is accomplished against a urethane surface 66. Since the velocity of each roving is known, as is the compacting head travelling speed, the cutting and clamping step can be accurately programmed to produce bands having fewer rovings, with the resulting band becoming narrower and thinner at the same time, as is shown in FIG. 9C. At the conclusion of a "pass", the cutters and clamps cut and clamp all of the rovings. FIGS. 10A-10D illustrate the means by which the rovings are rethreaded through the adjutable comb and under the compaction roller to the mandrel.

FIG. 10A illustrates the normal "run" condition wherein each roving 70 is routed through horizontal guide rollers 72, 74, a fixed comb 76, a transport gripper assembly 78, past the path of the clamp 80 and knife 82, through an adjustable comb 84, and under the compaction roller 86 to the mandrel 88.

At the conclusion of a laminating stroke, the knife 82 and clamps 80 assemblies are pulsed across the rovings thereby cutting and clamping each roving as shown in FIG. 10B.

Rethreading of the rovings is accomplished first, as shown in FIG. 10C, by roving gripping of the transport gripper assembly 78. Once the rovings are firmly secured, the transport gripper assembly 78 advances the rovings to the mandrel, as indicated by the dotted lines 90.

This procedure continues, as shown in FIG. 10D with the compaction roller 86 being raised to its uppermost position and with the adjustable comb 84 being rotated to its maximum roving intraspacing position. Thereafter, the compaction roller 86 is repositioned to its mandrel-engaging position, shown in dotted lines at 92, thereby positioning the rovings through the adjustable comb 84, and the transport gripper assembly 78 is repositioned to the position shown in FIG. 10A, thereby completing the rethreading procedure.

FIG. 11 illustrates integration of the comb apparatus, the cut and clamp apparatus, the rethreading clamps (all provided within housing 100) and the compaction roller 102 into a single head, indicated generally at 104. The head is shown routing and compacting rovings 106 against a mandrel 108.

The process of forming structure via fiber lamination requires relative rotary and linear motion between the head 104 and the mandrel 108. Generally, it is more practical for the head to remain stationary with the mandrel rotating and translating with respect to the head. Nonetheless, the head must have freedom of movement in at least two directions. First, it must translate radially, in a direction generally indicated by arrow 110 with respect to the axis of rotation of the mandrel to thereby accommodate the variation in radial dimensions of the mandrel and maintain the desired compacting contact.

Also, the head 104 must rotate about the radial translation axis, as indicated by arrow 112. This rotation implements a "steering" step in the fiber lamination method. Steering enables precise alignment of the rovings with respect to the mandrel regardless of the nature of the curvature of the mandrel surface.

It is important to note, however, that steering is made feasible in the fiber lamination process by the fact that the rovings, and to some extent the filaments within each roving, are capable of translation with respect to one another to compensate for the fact that the linear speed of the rovings are different due to the fact that each roving is being placed at a different radius and angle on a rotating/translating body. Steering is, therefore, not possible with tape lay-up methods.

A third degree of freedom, as indicated by arrow 114, may be provided to the head 104 to accommodate nonnormality of the head's translation/rotation axis to the mandrel surface if compactor roll compliance is not sufficient to assure proper compaction. In addition, this third degree of freedom could be used for "banking" of the roller axis as it steers, thereby causing the linear velocity of the compactor periphery to more closely match variations in roving velocity. That is, for example, more rovings per roller revolution must be laid down on the convex portion of a curved path than on the concave section.

Movement of the head 104, in each of its three degrees of freedom, is controlled by apparatus 120. Apparatus for controlling the head, as described above, is well known in the art, such that a detailed discussion thereof will not be given herein. Equipment of this type may be purchased from McClean Anderson Co., Menomonee Falls, Wisc. The apparatus 120 may, in turn, be controlled via computer 122. Computer controlled manufacturing has developed to the state that it would be easy to provide the computer 122 with information such that the mandrel 108 and head 104 would be controlled in such a manner that any desired structure would automatically be manufactured. Such controls are well known in the machine tool art.

Figure 12:
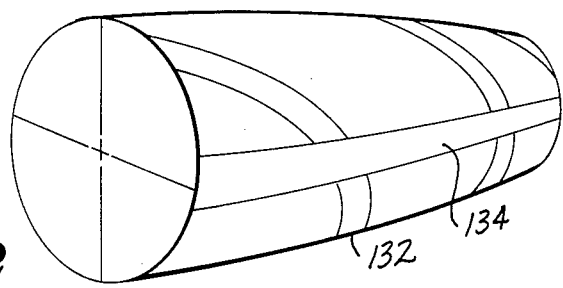
FIG. 12 is a perspective view illustrating contoured gores formed on an ogive mandrel.

For example, FIG. 12 illustrates a typical air-craft shape. This shape would be manufactured by the present process on an ogive mandrel 130. The fiber lamination process, under computer control, could automatically lay the contoured gores, such as tapered gores 132 and 134, to manufacture the desired shape. Axial gore 132 is also of a tapered thickness.

Figure 13:
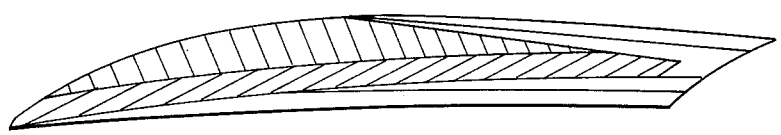
FIG. 13 is a perspective view of contoured and tapered plies on an airfoil shape.

FIG. 13 illustrates a typical aircraft wing skin employing both tapered and contoured plies. The various orientations of the plies are arranged to satisfy stress flow and magnitude on the wing skin. As compared with prior techniques for constructing wing skins, the present fiber lamination technique provides a means to precisely form the skin structure to meet load requirements, without requiring material excess.

Figure 14:
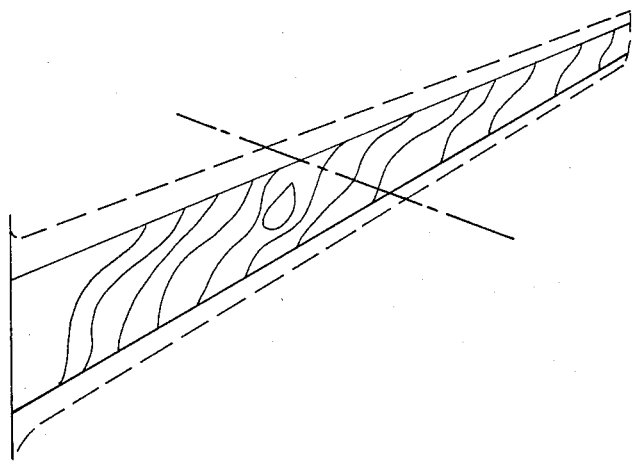
FIGS. 14 and 15 are computer generated stress lines for an airfoil shape.
Figure 15:
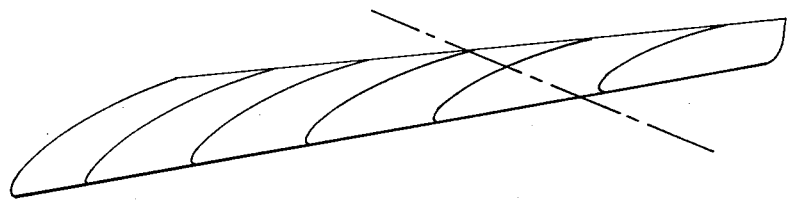

FIGS. 14 and 15 suggest a manner by which the computer control of FIG. 11 may yet further automate the process of making structure, such as a wing skin. FIG. 14 illustrates maximum stress profile lines anticipated on a wing structure. FIG. 14 shows a "sweep" across a stress profile, whereas FIG. 15 shows an identical sweep across the same location to establish the x, y and z geometric profile of the airfoil shape. These sweeps may be used to calculate filament count to satisfy the stress, thus dictating a required roving density profile and roving orientation. Thus, data incorporating the information in FIGS. 14 and 15 may be directly fed to the computer control 122 of FIG. 11, whereby the computer would automatically drive the mandrel and head to manufacture the structure capable of handling the anticipated loads.

Figure 16:
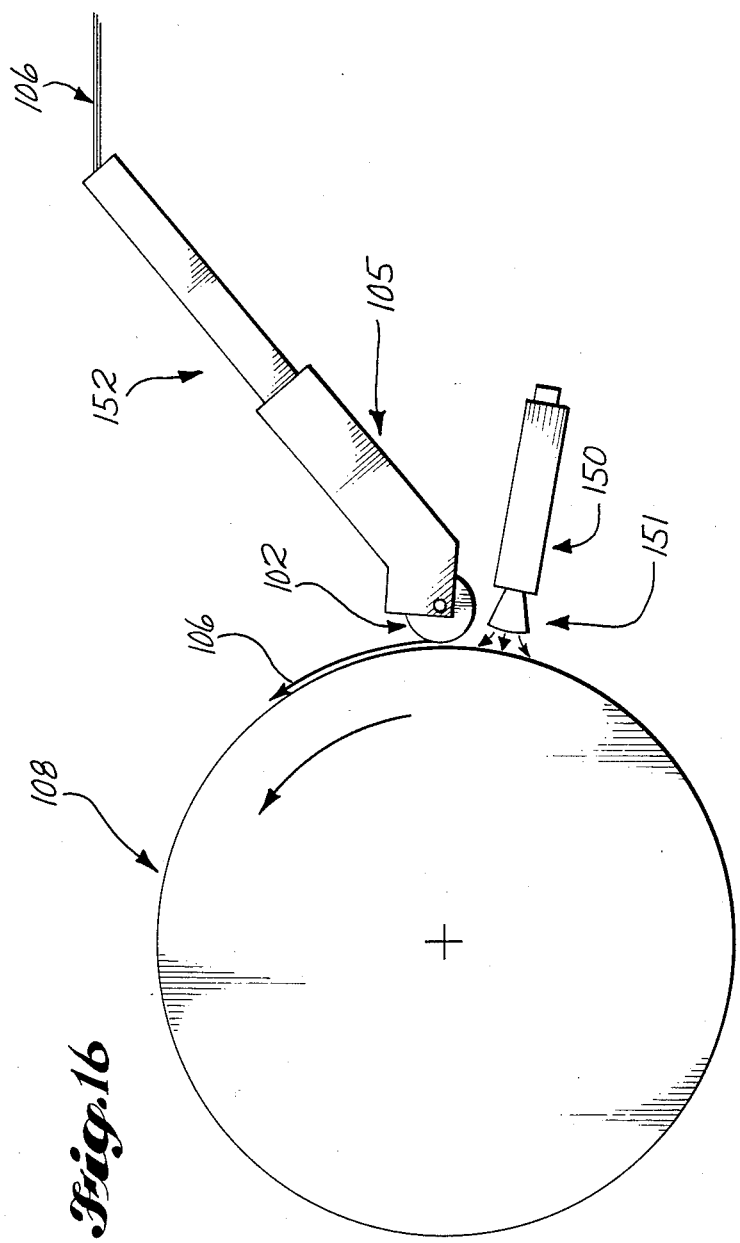
FIG. 16 illustrates means to adapt the fiber lamination process for use with fiber substrates impregnated with thermalplastic resins.

The fiberlamination process and apparatus may also be applied and adapted to fiber substrates impregnated with thermalplatic resins. For thermalplastic "prepregs", heat is supplied to the incoming rovings and to the mandrel surface as shown in FIG. 16.

Here, the incoming rovings 106 enter into a roving heating section 152 containing quartz heating lamps (not shown). A "zero motion detector" is employed along with a thermostat within unit 152 to monitor the heat input to the rovings. A commercially available hot air gun 150 directs hot air to the mandrel surface 108 via the nozzle 151 to heat prepreg which is applied just prior to the rovings 106 passing into the compaction roller 102. By action of the compaction roller 102, the heated and "tacky" substrate is combined with the heated and compliant rovings to form a cohesive bond.

FIGS. 17A and 17B further illustrate the mounting of the hot air gun 150 and the hot air nozzle 151.

In summary, a method and apparatus for the manufacture of structure by fiber lamination has been described herein.

While a detailed description of the present invention has been given, it should be understood that many modifications and variations thereto are possible, all of which fall within the true spirit and scope of the invention.

For example, whereas the invention has been illustrated using a "male" rotating mandrel, it should be understood that the process is easily implemented with existing "lay-up" equipment for use with a "female" mandrel.

I claim:

1. A method for producing fiber laminations comprising the steps of:
   (a) providing a plurality of rovings, each roving comprised of a bundle of resin impregnated filaments;
   (b) predeterminedly guiding said rovings to a receiving surface, with predetermined spacing between said rovings; and
   a predeterminedly contoured mandrel for supporting the fiber laminations;
   guide means for guiding each of a plurality of rovings, with each roving being comprised of a bundle of resin impregnated filaments, to said mandrel, the guide means comprising an expandable and contractable comb having two sets of tines, each offset from the other, one set of tines for guiding one group of rovings with a remaining set of tines for guiding the remaining rovings; and
   compaction means for compacting the rovings against the mandrel such that adjacent rovings permanently bond together whereby the compacted rovings form a band contoured to the mandrel.

2. The method of claim 1 wherein step (b) comprises the step of:
   (i) controlling the spacing, d, between the rovings to thereby vary the height, h, and the filament density of said band.

3. The method of claim 1 wherein step (b) comprises the steps of:
   (i) providing a fixed position comb, the comb having a plurality of tines with each roving being routed through a pair of said tines;
   (ii) providing a predeterminedly positioned, rotatable comb, the rotatable comb having a plurality of tines with each roving being routed through a pair of said tines; and
   (iii) controllably rotating said comb to uniformly fix the distance, d, between the rovings at the receiving surface.

4. The method of claim 1 wherein step (b) further comprises the steps of:
   (i) providing an expandable and contractable comb having two sets of tines, each offset from the other; and
   (ii) guiding one group of roving through one set of tines and the remaining rovings through the other set of tines.

5. The method of claim 1 wherein step (b) further comprises the steps of:
   (i) providing a hinged comb pair;
   (ii) routing the rovings through the tines on each of the combs; and (iii) controlling the angle formed by the hinged comb pair to thereby control the roving spacing, d.

6. The method of claim 1 comprising the further step of:
(d) severing selected rovings prior to steps (b) and (c) to thereby predeterminedly vary the cross-sectional contour of the resultant band.

7. The method of claim 6 comprising the further step of:
(e) clamping a roving in a predetermined position prior to its being severed per step (d); and
(f) controllably rethreading and guiding a clamped roving to said receiving surface.

8. The method of any one of claims 1 through 7 wherein step (c) further comprises the step of:
applying sufficient compression force to the rovings such that application of additional force does not significantly increase the compaction of the rovings.

9. The method of claim 2 wherein step (c) further comprises the step of:
applying a controlled compression force to the rovings to, in conjunction with the spacing, d, control the thickness and width of the band.

10. The method of any one of claims 1 through 7 comprising the further steps of:
providing a control head for both guiding and spacing the rovings, per step (b), and compacting the rovings, per step (c); and
providing a controlled relative rotary and linear motion between the receiving surface and said control head to thereby precisely position the band on the receiving surface.

11. The method of any one of claims 1 through 7 wherein the rovings are impregnated with a heat setting binder, the method comprising the further steps of:
heating the rovings to a predetermined temperature to thereby establish a predetermined tack prior to compacting; and
heating the receiving surface to a predetermined temperature, such that upon compacting a cohesive intraroving bond is formed.

12. The method of claim 1 comprising the further steps:
automatically controlling the compacting compression force and the intraroving spacing such that a band of predetermined width, height and filament count is formed; and
automatically controlling the relative rotary and linear motion between the receiving surface and the formed band,
such that the resultant formed structure exhibits a predetermined stress profile.

13. Apparatus for producing fiber laminations comprising:
(c) compacting said rovings against said receiving surface such that adjacent rovings permanently bond together and form a continuous band conformed to the contour of the receiving surface.

14. The apparatus of claim 13 further comprising:
means for severing selected rovings prior to said rovings being compacted into said band to thereby predeterminedly vary the cross-sectional contour of the band.

15. The apparatus of claim 14 further comprising:
clamping means for clamping a roving in a predetermined position prior to severing of the rovings; and
rethreading means for controllably rethreading a clamped roving through said guide means to said mandrel.

16. The apparatus of claim 13 wherein the compaction means further comprises:
means for applying sufficient compression force to the rovings, such that application of additional force does not significantly increase the compaction of the rovings.

17. The apparatus of claim 13 wherein the compaction means further comprises:
means for applying a controlled compression force to the rovings to, in conjunction with the spacing, d, control the thickness and the width of the band.

18. The apparatus of any one of claim 13 wherein the apparatus further comprises:
a control head for both guiding and compacting the rovings; and
means for controlling the relative rotary and linear motion between the mandrel and said control head to thereby precisely position the band on the mandrel.

19. The apparatus of claim 14 wherein the apparatus further comprises:
a control head for both guiding and compacting the rovings; and
means for controlling the relative rotary and linear motion between the mandrel and said control head to thereby precisely position the band on the mandrel.

20. The apparatus of claim 13 wherein the rovings are impregnated with a heat setting binder further comprising:
means to heat the rovings, prior to compacting, to a predetermined temperature; and
means to heat the mandrel surface to a predetermined temperature, such that upon compacting a cohesive intraroving bond is formed.

21. The apparatus of claim 13 wherein the apparatus further comprises:
a control head for both guiding and compacting the rovings;
means for controlling the relative rotary and linear motion between the mandrel and said control head to thereby precisely position the head on the mandrel; and
automatic control means for automatically controlling the compression force of the compaction means and the intraroving spacing such that a band of predetermined width, height and filament count is formed, the automatic control means also including means for automatically controlling the relative rotary and linear motion between the receiving surface and the formed band, such that the resultant formed structure exhibits a predetermined stress profile.

22. Apparatus for producing fiber laminations comprising:
a predeterminedly contoured mandrel for supporting the fiber laminations;
guide means for guiding each of plurality of rovings, with each roving being comprised of a bundle of resin impregnated filaments, to said mandrel, said guide means comprising a hinge comb pair, each comb having tines for guiding the rovings therethrough, and the angle formed by the comb pair being adjustable to control the roving spacing, d;

compaction means for compacting the rovings against the mandrel such that adjacent rovings permanently bond together whereby the compacted rovings form a band contoured to the mandrel.

23. The apparatus of claim 22 further comprising:
means for severing selected rovings prior to said rovings being compacted into said band to thereby predeterminedly vary the cross-sectional contour of the band.

24. The apparatus of claim 23 further comprising:
clamping means for clamping a roving in a predetermined position prior to severing of the roving; and
rethreading means for controllably rethreading a clamped roving through said guide means to said mandrel.

25. The apparatus of claim 22 wherein the compaction means further comprises:
means for applying sufficient compression force to the rovings, such that application of additional force does not significantly increase the compaction of the rovings.

26. The apparatus of claim 22 wherein the compaction means further comprises:
means for applying a controlled compression force to the rovings to, in conjunction with the spacing, d, control the thickness and width of the band.

27. The apparatus of either of claims 22 or 26 wherein the apparatus further comprises:
a control head for both guiding and compacting the roving; and
means for controlling the relative rotary and linear motion between the mandrel and said control head to thereby precisely position the band on the mandrel.

28. The apparatus of claim 23 wherein the apparatus further comprises:
a control head for both guiding and compacting the rovings; and
means for controlling the relative rotary and linear motion between the mandrel and said control head to thereby precisely position the head on the mandrel.

29. The apparatus of claim 22 wherein the rovings are impregnated with a heat setting binder further comprising:
means to heat the rovings, prior to compacting, to a predetermined temperature; and
means to heat the mandrel surface to a predetermined temperature, such that upon compacting a cohesive intraroving bond is formed.

30. The apparatus of claim 22 wherein the apparatus further comprises:
a control head for both guiding and compacting the rovings;
means for controlling the relative rotary and linear motion between the mandrel and said control head to thereby precisely position the head on the mandrel; and
automatic control means for automatically controlling the compression force of the compaction means and the intraroving spacing such that a band of predetermined width, height and filament count is formed, the automatic control means also including means for automatically controlling the relative rotary and linear motion between the receiving surface and the formed band, such that the resultant formed structure exhibits a predetermined stress profile.

* * * * *